INVENTOR.
BO HJORTH

United States Patent Office 3,396,278
Patented Aug. 6, 1968

3,396,278
PHOTOELECTRIC LENGTH MEASUREMENT
USING COARSE AND FINE PHOTOCELLS
Bo Hjorth, Sollentuna, Sweden, assignor to North American Philips Company, Inc., New York, N.Y., a corporation of Delaware
Filed Nov. 12, 1964, Ser. No. 410,671
Claims priority, application Sweden, Jan. 14, 1964, 408/64
3 Claims. (Cl. 250—219)

ABSTRACT OF THE DISCLOSURE

A length measuring device is provided with a first group of closely spaced sensors and a second group of more widely spaced sensors, both sensor groups being responsive to the passage of an article of length. The sensor devices are designed to have only one sensor activated at any point in time by means of a series of gates which are sequentially energized to receive signals upon the energization of one preceding signal. The position of the article with regard to the first group of sensors is defined by means of a storage device having a count therein indicative of the activation of sensors in accordance with the trailing edge of the article. The second group of sensors responds to the leading edge of the article and an accumulating storage device is coupled to the sensors to give an indication of position. When the article has completed passage at a predetermined point, a gating device responds to empty the contents of both storage devices into a counter, thereby providing an indication of the article length.

The present invention relates to a device for determining the length of elongated objects, as logs of timber or the like, which are transported in their longitudinal direction along a transportation path, and in particular to a device giving output information in digital form suitable to be treated in a digital computer. Known measuring devices of similar kind are provided with a pulse generator coupled to the driving mechanism or band. The pulse generator is switched-on when the front edge of the object has reached a measuring station and switched-off when the rear edge reaches the same measuring station. The number of produced pulses will then be a measure of the length of the object. Extensions in the band or other mechanical factors however, may influence the measuring result and one object of the invention is to produce a measuring device which operates independently of the driving mechanism. Another object of the invention is to produce a device which allows movement in backward direction to a certain degree.

In accordance with the invention there is provided, at measuring points along the transporting path, a group of means for sensing the presence of an object at each of the respective measuring points. Furthermore, at one or more measuring points situated either before or after the group of sensing means, as seen in the transportation direction, there is another object sensing means called a triggering means. The device furthermore comprises an evaluation means with a memory, which is connected to the first sensing means and transmits a pulse to the memory for each release or actuation of a sensing means in the group of sensing means, while the triggering means produces a triggering pulse at actuation or release of the said triggering means. The number of pulses transmitted to the memory before or after the time for appearance of the triggering pulse is then a measure of the length of the object.

The invention is now explained more fully in connection with the accompanying drawings, in which—

Figure 1:
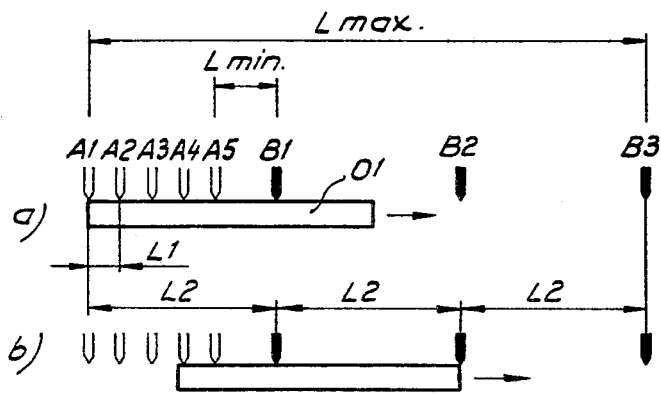
Figure 2:
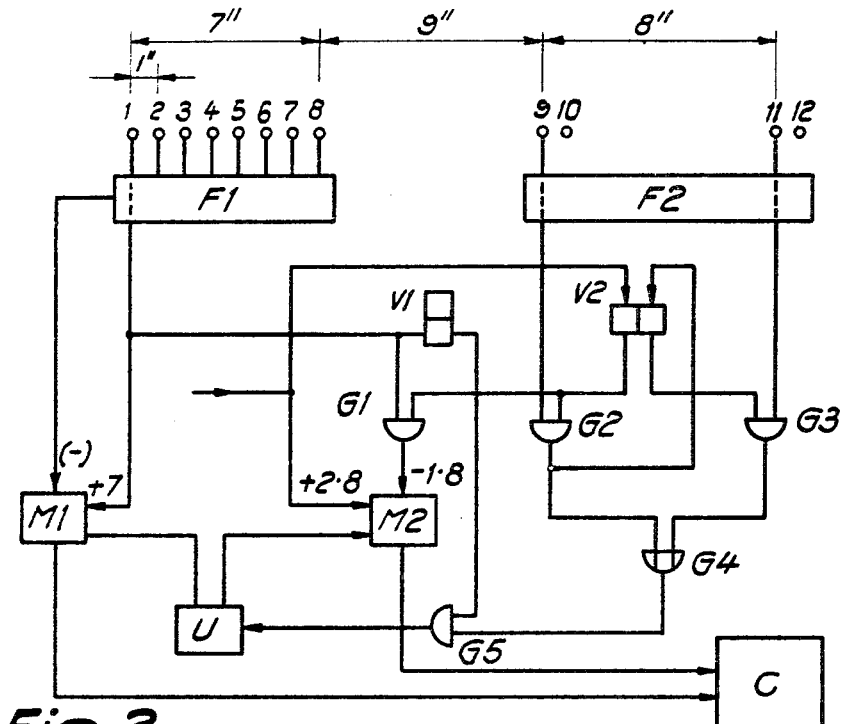
Figure 3:
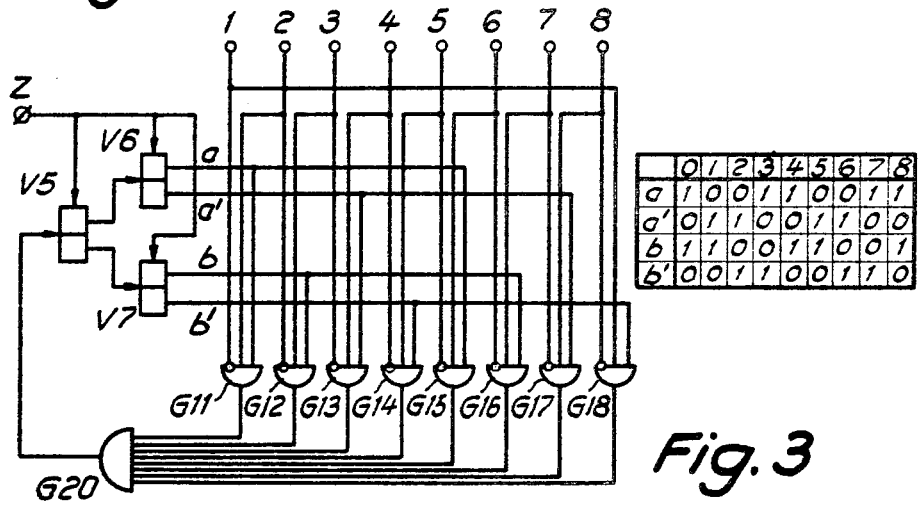

FIG. 1 shows a schematic view of the device for illustrating the measuring principle according to the invention,
FIG. 2 shows a block diagram for a photo electrical length measuring device according to the invention and
FIG. 3 shows a block diagram of a unit included in the device according to FIG. 2.

In FIG. 1 the reference O1 designates an object, for example a log of timber, the length of which is to be determined. The object is transported in the direction indicated by the arrow beyond a number of measuring stations A1–A5 for sensing the rear edge of each passing object and producing a pulse the moment the rear edge passes the respective measuring station. The measuring stations B1–B3 sense the front edge of passing objects and produces a pulse each time a front edge passes the respective station. (For reasons which will be evident the front edge sensitive measuring stations B1, B2, B3 are doubled so that they each comprise two measuring units at a small distance from each other in the transporting direction.)

The rear edge sensitive measuring stations are placed at uniform relatively small distances L1 from each other, L1 being the required resolution at the length determination. The front edge sensitive measuring stations are placed at uniform distances L2 from each other, L2 being essentially greater than L1. The distance L2 is furthermore so chosen that it is equal to a number of intervals L1 (in the example shown, L2 is equal to six intervals of L1).

In FIG. 1 are shown the two moments when the measuring of a passing log is effected. In the position shown in FIG. 1a, when the rear end of the log is just passing the first rear edge sensitive station A1, a first or coarse information is achieved about the length of the log by the number of front edge sensitive measuring stations which have registered passage of the front edge. In the example shown, the information received is that the length of the log is greater than L2 but smaller than 2L2. In the position shown in FIG. 2b, when the front edge is just passing its first front edge sensitive measuring station after the passage of the rear end beyond A1, the final measurement is effected by determining the position of the rear edge corresponding to the number of passed stations of the rear edge sensitive stations A1–A5. In the shown example the length of the log is determined to be $L2+3L1=9$ unit lengths L1. $L_{min}$ and $L_{max}$ represent the minimum and maximum length respectively of objects which can be measured in the device.

If the objects do not vary appreciably in length, i.e., if the difference between $L_{max}$ and $L_{min}$ is small, it is possible to use one single front edge sensitive measuring station. However, if the difference between $L_{max}$ and $L_{min}$ is relatively great, the use of one single front edge sensitive station will result in a very large number of measuring units. In order to in this case decrease the total number of measuring units a plurality of front sensitive measuring stations has to be arranged. For each given combination of $L_{max}$ and $L_{min}$ and the resolution L1 it is possible to determine a combination of the number of rear edge sensitive measuring stations and number of front edge sensitive measuring stations giving a minimum of the total number of measuring units.

In FIG. 2 is shown in block diagrammatic form a photo-electric measuring device for determination of the length of logs of timber with a resolution of one foot. The length of the logs can vary between 9 and 24 feet.

In the drawing reference numerals 1–12 designate twelve measuring points each having a photoelectric measuring unit consisting of a photocell with a light source arranged on opposite sides of the transporting path so that the length flow against the photocell in interrupted by a log situated at the measuring point. The eight first measuring-points 1–8 form a group and are situated at a distance of 1 foot (equalling the resolution) from each other. The remaining measuring points are arranged in pairs, the distance between the measuring points 9 and 11 being 8 feet (equalling the coarse interval) and the distance between measuring point 9 and the first measuring point 1 in the said group being 16 feet (equalling 2 coarse intervals).

The photocells situated at the measuring points 1–8 are connected to a device F1 for following the rear edge of a passing log. The device F1 comprises logical circuits so constructed and connected that an output pulse is received from F1 for each measuring point passed by the rear edge of a log, while the front edge of the log does not cause any output pulses from F1. The first pulse from F1, indicating that a rear edge is just passing the first measuring point 1, is adapted to preset a first binary register or memory M1 to the number 7, as indicated in the drawing by the connection between the measuring point 1 and an input of M1 designated +7. The pulses thereafter received from F1, which are in the same manner applied to the memory M1, causes M1 to count backward so that the stored number is decreasing one unit for each received pulse. The number stored at memory M1 will therefore indicate in each moment the number of points of the measuring points 1–8 which have not been passed by the rear edge of a passing log.

The photocells situated at the measuring points 9–12 are connected to a device F2 for following the front edge of a passing log. The device F2 also comprises logical circuits which are so constructed and connected that an output pulse is delivered on separate output leads from F2 when a front edge of a log passes measuring point 9 and 11. The passage of a rear edge does not cause any output pulses from F2. The measuring points 10 and 12 are arranged in order to prevent a rear edge, which has already passed measuring point 9 or 11 and is thereafter moved backwards past the said measuring points, from being erroneously indicated as the front edge of a following log. For producing a pulse from F2 therefore, the condition must be fulfilled that presence of log is indicated at measuring point 9 or 11, respectively and absence of log is indicated at measuring point 10 or 12, respectively, whereby the possibility of the erroneous indication has been eliminated. Information about how many coarse intervals, i.e. 8-feet intervals, a log comprises is stored in a second binary register or memory M2. The number 16 is initially stored and remains in the memory if the log is longer than 16 feet, i.e. if the front edge of the log reaches the measuring point 9 before the rear edge reaches measuring point 1. Final measurement and emptying of the two registers is then effected when the front edge reaches measuring point 11. If the length of the log is less than 16 feet, i.e. if the rear edge reaches measuring point 1 before the front edge reaches measuring point 9, the number stored in memory M2 is decreased to 8 and final measurement and emptying of the registers is then effected when the front edge reaches measuring point 9. In both cases the length of the log expressed in the unit length feet is equal to the sum of the numbers stored in the two registers.

The device comprising logical circuit elements for achieving the function described in the foregoing consists of two bistable flip-flops V1 and V2 with separated inputs and a number of AND-gates G1, G2, G3 and G5 and an OR-gate G4. The device operates in known manner with two voltage levels of which one is said to represent logical 1 and the second logical 0. For simplicity 1 is assumed to correspond to a voltage exceeding a predetermined value and 0 absence of voltage. Presence of an object at a measuring point is assumed to correspond to voltage 1. The AND-gate require voltages corresponding to 1 at both inputs for producing an output voltage representing 1, while the OR-gates require a voltage corresponding to the condition 1 at any of their inputs for producing an output voltage 1.

In the initial position flip-flop V1 is set such that it delivers voltage 0 to the gate G5, and V2 is set such that it delivers voltage 1 to the gates G1 and G2 and voltage 0 to G3. The number stored in M1 is indefinite while M2 comprises the number 16.

*Example a.*—The log is shorter than 16 feet.

When the rear edge of the log is passing measuring point 1 the number +7 is registered in memory M1, which number is thereafter decreased one unit for each point traversed of the measuring points 2–8. The reference pulse derived from measuring point 1 is also led to gate G1 and to flip-flop V1, which is switched and delivers a voltage 1 to the gate G5. Gate G1, already having a voltage corresponding to 1 at its second input, delivers an output pulse to M2, which responds to this pulse by decreasing the stored number from 16 to 8.

When the front edge of the log reaches the measuring point 9 the gate G2 receives a voltage corresponding to 1 at both its inputs, thereby producing an output pulse which passes through OR-gate G4 to gate G5. Gate G5 had already a voltage corresponding to 1 at its second input and delivers a pulse to a triggering device U which in turn, upon the reception of the pulse, activates the memories M1 and M2. Memory M1 then delivers its stored number to a mechanical counter C and thereafter, the memory M2 delivers its stored number (8) to the counter C. The counter C is therefore stepped forwards a number of steps equal to the sum of the numbers stored in M1 and M2, which sum is equal to the length of the log expressed in feet.

*Example b.*—The log is longer than 16 feet.

The first thing occurring in this case is that the front edge reaches the measuring point 9. Then gate G2 receives a voltage corresponding to 1 on both its inputs and therefore delivers an output pulse which is led to flip-flop V2 for switching the same. When V2 is switched the voltage corresponding to condition 1 disappears both from G1 and G2, while instead G3 receives a voltage corresponding to 1. The pulse from G2 also passes through OR-gate G4 to final gate G5 but this gate has a voltage corresponding to zero at its second input and therefore cannot deliver triggering pulse to the triggering device U.

When the rear edge thereafter reaches measuring point 1 M1 is actuated in the same way as described above. The reference pulse derived from measuring point 1 switches flip-flop V1 as before so that this flip-flop delivers a voltage 1 to gate G5, while gate G1 does not pass the reference pulse to memory M2, because G1 now receives a voltage corresponding to 0 from flip-flop V2. The number 16 therefore remains in memory M2.

Both G3 and G5 now receive a voltage corresponding to 1 on one of their inputs. The pulse produced by F2 when the front edge of the log passes measuring point 11 therefore passes through G3 and G4 to G5 to pulse the triggering device U and cause triggering, emptying of the registers and resetting. The emptying of the registers is effectuated in the same way as described above but M2 now delivers 16 pulses to the counter C.

Due to the fact that the front edge of a measuring object successively prepares gating circuits associated with a following measuring point, the possibility for a front edge of an already measured object which is still within the measuring range to produce a triggering pulse is eliminated. In each moment, only one gate is prepared, the gate associated with that measuring point which the front edge is approaching. All remaining gates are blocked and only the actual measuring object can produce triggering pulse.

Instead of presetting the memory M1 to a predetermined number and operating the memory backwards, circuit simplification may be achieved by initially setting the memory to condition zero and operating the memory in the forward direction, emptying being effected such that the memory is stepped forwards until it is again in condition zero. Memory M2 is suitably emptied so as to step it forward to zero position from a preset position either by a whole cycle for delivering sixteen pulses or a half cycle for delivering eight pulses.

The two devices F1 and F2 for following the rear edge and following the front edge, respectively, may in principle consist of a number of AND-gates as is shown in FIG. 3. The device F1 consists according to FIG. 3 of eight AND-gates G11–G18 each associated with one of the measuring points 1–8. The outputs of the AND-gates are each connected to an input of an OR-gate G20 the output of which is connected to a bistable flip-flop V5. Flip-flop V5 has its two outputs connected to two following bistable flip-flops V6, V7 whereby flip-flop V6 is switched upon the triggering of V5 in one direction and V7 is switched upon the triggering of V5 in opposite direction. Each of the flip-flops V6, V7 is provided with two output leads designated $a$, $a'$ and $b$, $b'$, respectively, leading to different inputs of the gates G11–G18. The leads $a$, $a'$ and $b$, $b'$ respectively may assume voltage values designated 0 and 1, the leads in each pair being at different voltage levels in each moment. Switching of a flip-flop involves reversing of the output voltages.

The AND-gates G11–G18 have each three inputs of which the first is the inverting input and is indicated in FIG. 3 by a ring connected to the measuring point associated with the actual gate. The second input is connected to the following measuring point, while the third is connected to one of the output leads from flip-flops V6 and V7. The condition for receiving output voltage 1 from any of the AND-gates is that voltage 0 appears at the inverting input and voltage 1 at the two remaining inputs. In the initial position the flip-flop V5 is set such that the first pulse received from G20 causes switching of flip-flop V6, while the next pulse causes switching of V7 etc. The gates V6 and V7 are set in the initial position such that the leads $a$, $b$ have voltage 1 and $a'$, $b'$ voltage 0.

The table in FIG. 3 illustrates how the excitation of the different output leads from V6 and V7 varies as the rear edge of an object passes the measuring points 1–8. Thus the column designated 0 shows the condition prevailing when the rear edge has not yet passed measuring point 1 (the initial position), the column designated 1 shows the condition prevailing after the rear edge has passed measuring point 1, the column designated 2 shows the condition prevailing after the rear edge has passed measuring point 2 etc. The operation is as follows:

When the measuring point 1 is passed by a rear edge the AND-condition for the first gate G11 is fulfilled, as the gate is receiving voltage 0 at its inverting input and voltage 1 from flip-flop V6 and measuring point 2 which is still shadowed. The AND-gate G11 delivers the output voltage 1, which voltage passes OR-gate G20 and switches flip-flop V5 which in turn switches V6. The output voltages from V6 are then reversed so that the AND-condition for G11 is cancelled and the output voltage from G11 is immediately interrupted. When measuring point 2 in the next moment is released the AND-condition of the second gate G12 is fulfilled as the gate then receives voltage 0 at its inverting input and voltage 1 flip-flop V7 and from measuring point 3 (still shadowed). The output voltage from G12 is led through G20 to trigger V5 which in turn triggers V7. The AND-condition of G12 then disappears and the output voltage is interrupted. The same procedure is repeated for the following measuring points and thus a pulse is received from OR-gate G20 at the passage of each of the measuring points 1–8, which pulse, as described above is stored in the first register M1. The flip-flops V5, V6, V7 can be regarded as a memory device for storing information about a passing rear edge in order to successively prepare the AND-gates associated with the following measuring points.

As is apparent from the table in FIG. 3 the code represented by the output voltages from the flip-flops V6 and V7 is repeated twice for each passing object. From the table it is also evident that the flip-flops after the passage of the last measuring point are in the same position as initially and the device is consequently zeroed automatically. However, if an error should arise a zero-pulse may be introduced at the terminal $z$.

The device F2 may be constructed in the same way as F1 except that the AND-condition of course must be different so that F2 will be sensitive for the passing of a front edge instead of a rear edge.

The AND-conditions of the two devices F1 and F2 may be summarized as follows.

Device F1 (rear edge):
(1) Absence of object at the measuring point.
(2) Presence of object at the following measuring point.
(3) The same condition fulfilled for the foregoing measuring point.

Device F2 (front edge):
(1) Presence of object at the measuring point.
(2) Absence of object at the following measuring point.
(3) The same conditions fulfilled for the foregoing measuring point.

For the last gate, condition 2 is replaced by the condition of presence or absence respectively at the first measuring point for F1 and F2 respectively. Furthermore the condition 3 for the first gate is replaced by the condition that the rear or front edge respectively of the foregoing object has passed the last measuring point.

By having these conditions for indicating a passing rear edge and front edge, respectively, a high degree of security against erroneous function due to varying operation conditions is achieved. Thus the influence of movements in backward direction is eliminated within certain limits, as well as preventing an erroneous indication if a plurality of objects are within the measuring range simultaneously. If an object should stop with its rear edge or front edge, respectively, just opposite a measuring station so that the current from the measuring photocell is indefinite and varies stepwise between different values, the logical treatment in the devices F1 and F2 makes that the output information from F1 and F2, respectively, in spite of this ripple will be unambiguous.

By comparing the number of times the codes are repeated by F1 and F2, a criterium is achieved for error alarm because the number of passing front and rear edges must be equal. If one measuring point does not function thus an error alarm device can be triggered. It is also possible to produce an alarm when the length of an object is less than a certain value, in the present example 9 feet, or exceeds a maximum value.

A number of modifications of the described device are possible within the scope of the invention. Thus it is possible to place the triggering photocells before the main group of photocells as seen in the transportation direction, in which case the triggering photocells are made sensitive for the rear edge and the photocells in the main group are made sensitive for the front edge. A triggering pulse is then produced when the rear edge of an object passes a triggering photocell provided that the front edge has reached the measuring range defined by the main group of photocells. Such a device can be built quite analogously to the described one. Furthermore, it is possible to count the number of released measuring points after the appearance of a triggering pulse. It is also possible to use sensing means operating with ultra sound, mechanically actuated contacts etc. instead of photoelectric devices.

What is claimed is:
1. A device for measuring the length of an object having movement relative to said device comprising a first sensing means having a first plurality of sensors, each of said sensors defining a fine interval of object length and positioned along the path of said object for sensing the trailing edge of said object relative to said sensing means, said first sensing means including a plurality of gating means each associated with a respective one of said sensors, switching means responsive to the output of each of said sensors and coupled to respective inputs of said gates, said switching means generating a unique combinatorial code for enabling each gate succeeding in turn a gate responding to activation of a sensor, a second sensing means for sensing the leading edge of said object along the path of said object and spaced from said first sensing means at a distance relatively greater than the interval between the sensors of said first sensing means, said second sensing means including a second plurality of sensors, first memory means connected to said first sensing means for storing discrete information representative of the position of said object relative to each of the sensors of said first sensing means, said first memory means having an initially stored numerical reference signal and responsive to signals received from successive ones of said first sensing means sensors to change said stored signal by one unit for each received signal, second memory means, first gating means interconnecting said first and second sensing means to said second memory means and responsive to the condition of said first and second sensing means for rendering the state of said second memory means representative of the position of said object with respect to both of said first and second sensing means, second gating means connected to said first gating means, said first and second gating means triggering said first and second memory means at the completion of the passage of the object in response to the condition of said sensors, and means responsive to said triggering connected to said first and second memory means for indicating the length of said object.

2. The combination of claim 1 wherein said sensors each comprise a photocell and a light source positioned on opposite sides of the path of said object such that the light flow from said light source to said photocell is interrupted by the passing of said object.

3. The combination of claim 1 wherein said sensing means each comprises a plurality of multi input AND gates, one of said gates for each of said sensors, an OR gate, means connecting the output of each of said AND gates to said OR gates, a first bistable device, means connecting the output of said OR gate to said bistable device, a second bistable device, a third bistable device, means connecting one output of said first bistable device to the said second bistable device, means connecting the complementary output of said first bistable device to said third bistable device, means connecting the outputs of said second and third bistable devices to the inputs of select ones of said AND gates, and means connecting each of said sensors to the inputs of select ones of said AND gates, whereby the outputs of each of said AND gates is representative of the relative position of a passing object with respect to each of said sensors.

References Cited
UNITED STATES PATENTS

| | | | |
|---|---|---|---|
| 2,916,633 | 12/1959 | Stone et al. | 250—219 |
| 3,061,732 | 10/1962 | Milnes | 250—219 |
| 3,066,226 | 11/1962 | Lindstrom | 250—219 |
| 3,159,749 | 12/1964 | Daleymple et al. | 250—219 |

RALPH G. NILSON, *Primary Examiner.*

M. ABRAMSON, *Assistant Examiner.*